Nov. 25, 1930.    H. W. HELMS    1,783,087
AUTOMATIC SEMITRAILER
Filed July 26, 1928    3 Sheets-Sheet 2
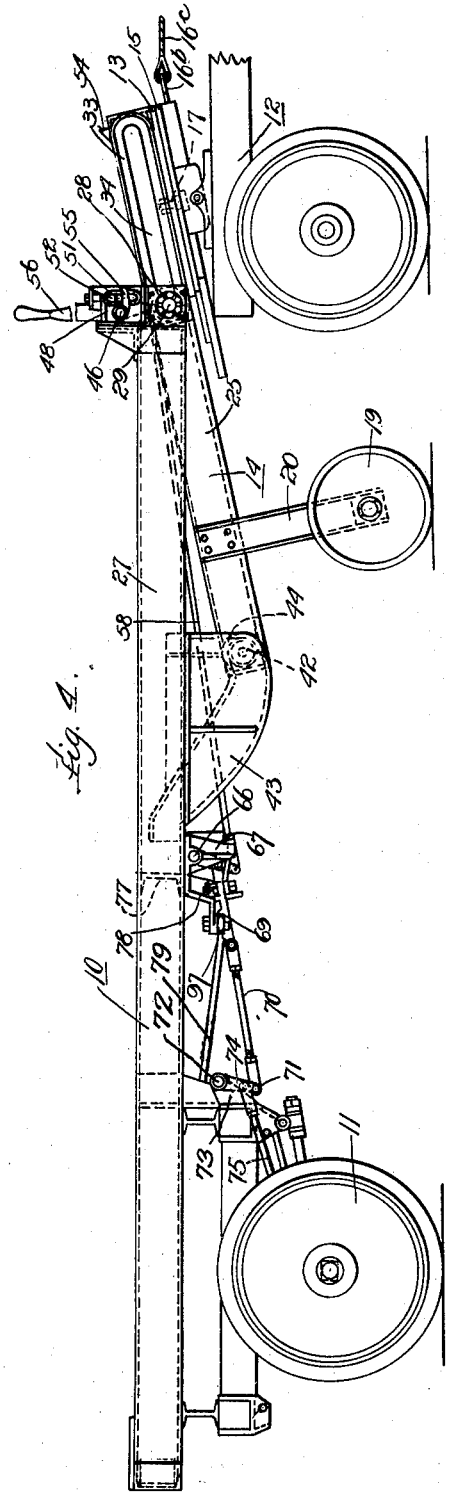
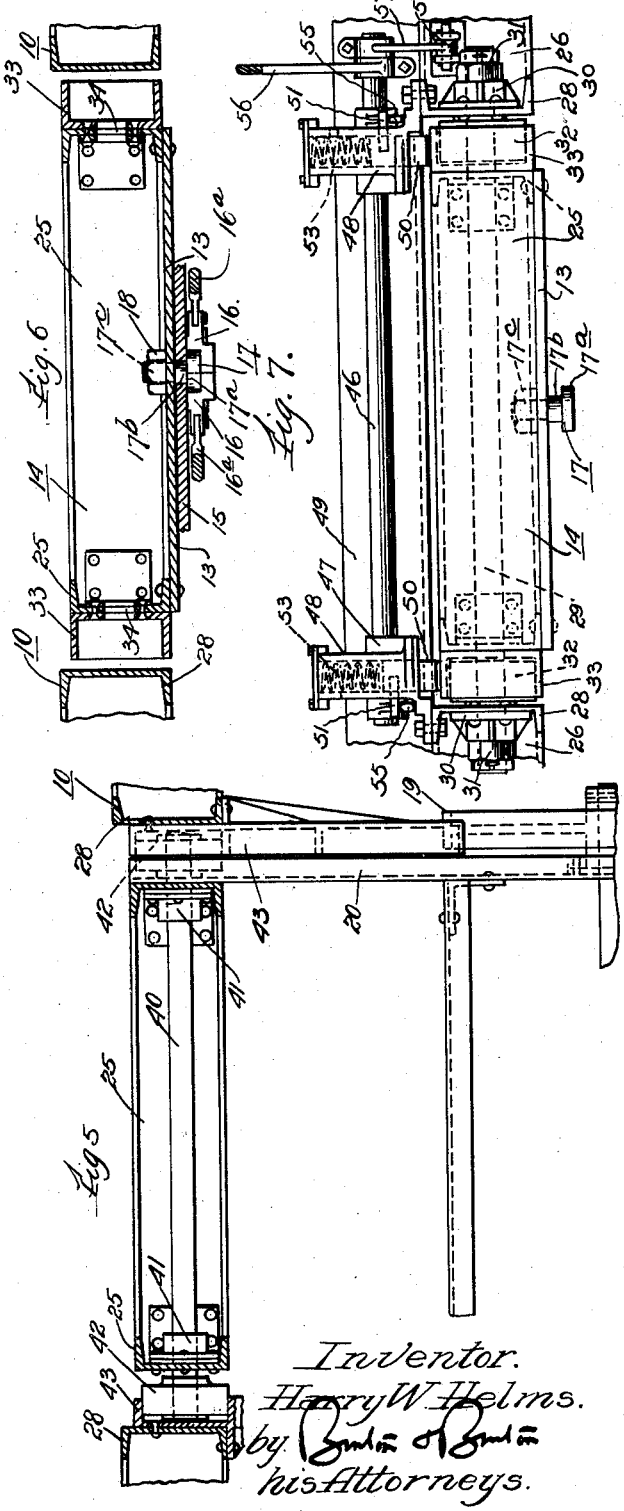
Inventor.
Harry W. Helms.
by his Attorneys.

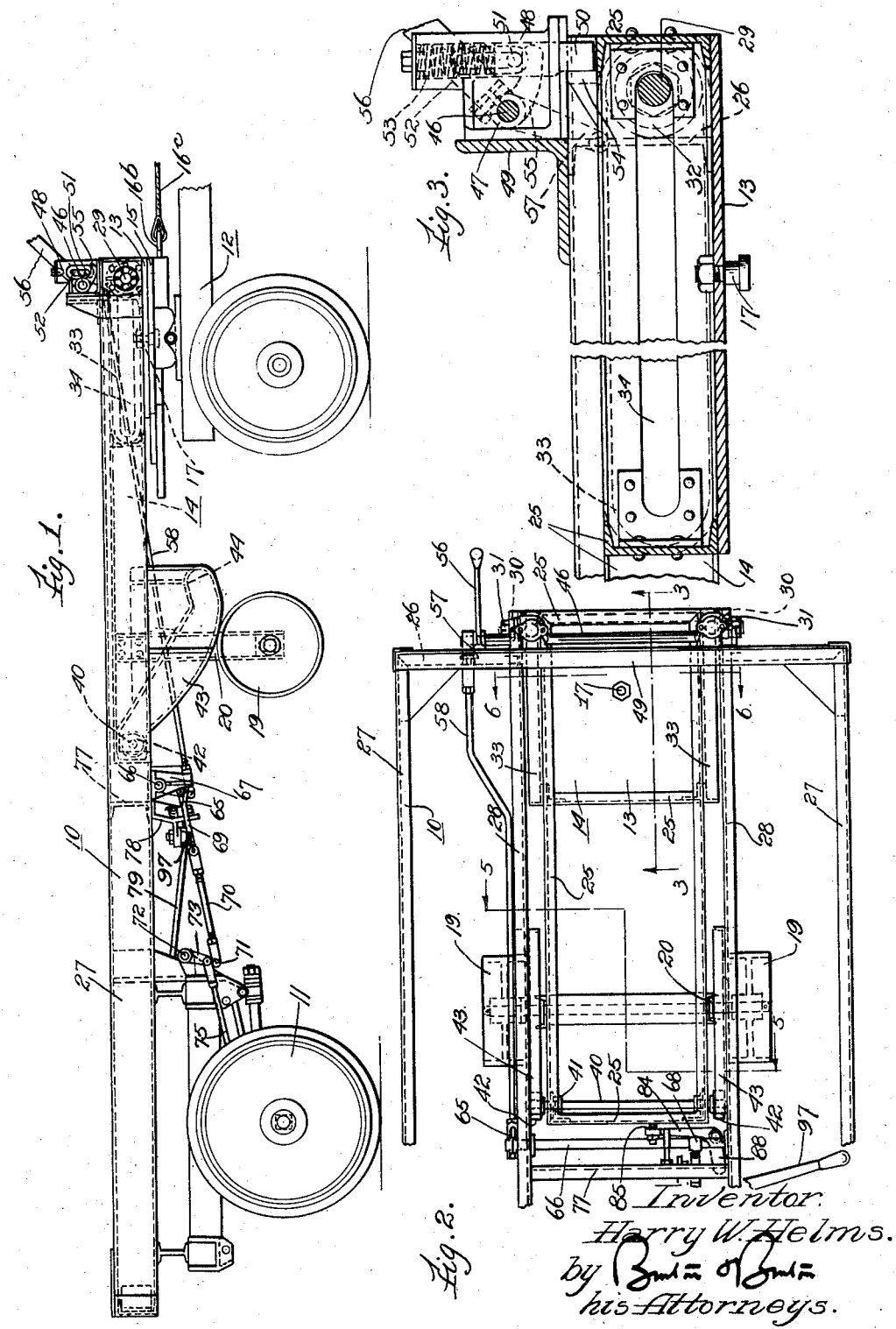

Nov. 25, 1930.    H. W. HELMS    1,783,087
AUTOMATIC SEMITRAILER
Filed July 26, 1928    3 Sheets-Sheet 3
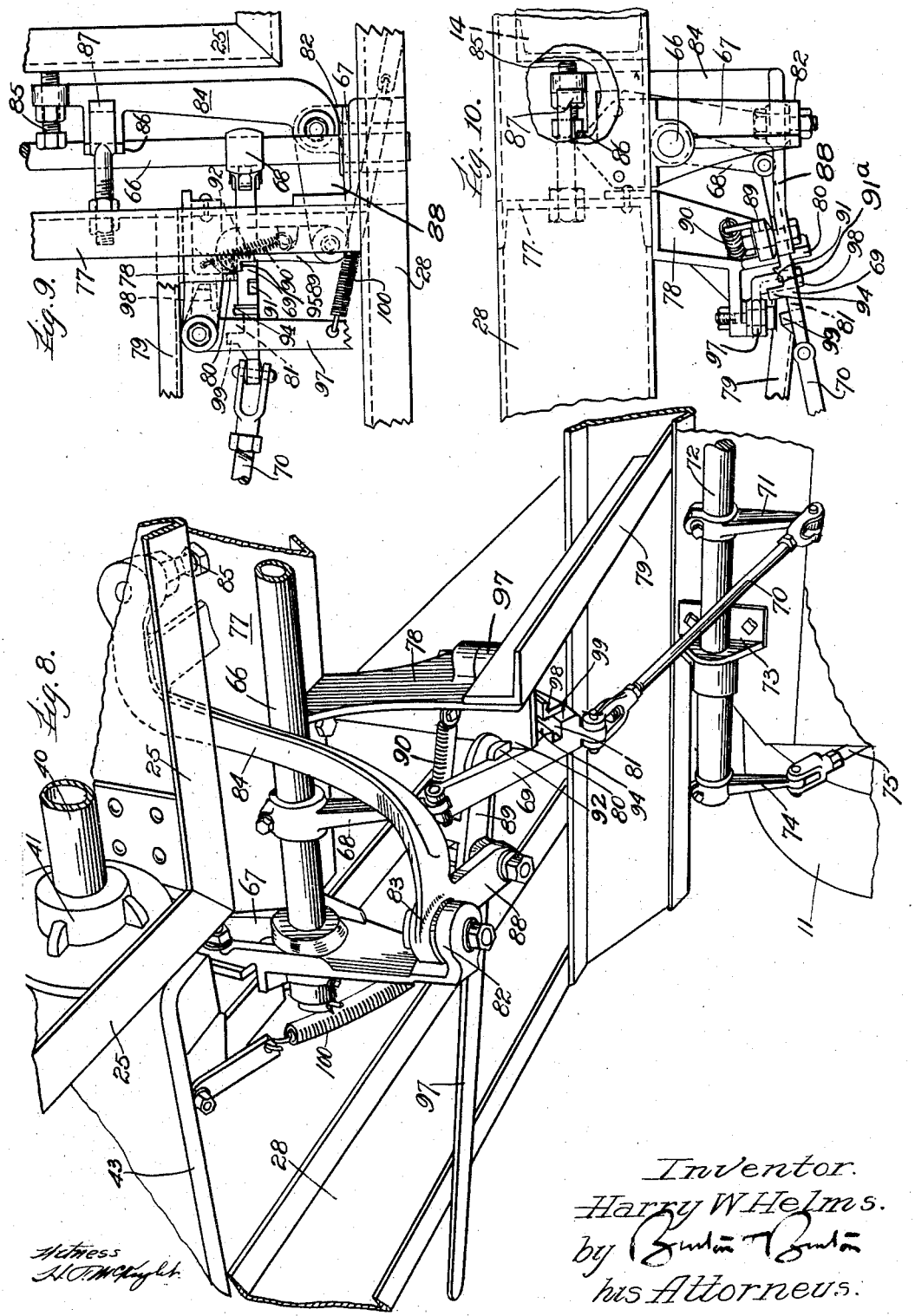
Inventor.
Harry W Helms.
by his Attorneys.

Patented Nov. 25, 1930

1,783,087

REISSUED

UNITED STATES PATENT OFFICE

HARRY W. HELMS, OF EDGERTON, WISCONSIN, ASSIGNOR TO HIGHWAY TRAILER COMPANY, OF EDGERTON, WISCONSIN, A CORPORATION OF WISCONSIN

AUTOMATIC SEMITRAILER

Application filed July 26, 1928. Serial No. 295,567.

This invention relates to a vehicle unit comprising a tractor and semi-trailer, and more particularly to improvements of construction by means of which the tractor and trailer are coupled and uncoupled, positively and with facility, together with means temporarily supporting the trailer when detached from the tractor. An object of the present invention is to utilize the coupling and uncoupling movements of the tractor and trailer for automatically moving the trailer supporting means out of and into operative positions, respectively.

Another object is to provide an improved construction adapted to permit engagement and locking together of the fifth wheel members of the tractor and trailer before any of the trailer load is assumed by the tractor.

A further object of this invention is to provide an improved construction for ensuring positive and safe temporary support for the trailer, which support is adapted to be carried into operative position before uncoupling of the fifth wheel members and not rendered inoperative until the fifth wheel members are locked together in coupled relation.

A still further object is to provide an improved coupling construction for tractor-semi-trailer units, which is simple, durable and positive in operation, and which may be economically manufactured. It consists in certain features and elements of construction, in combination, as herein shown and described, and as indicated by the claims.

In the drawings:

Figure 1 is a view in side elevation of a vehicle unit embodying the present invention; the trailer and tractor being shown in coupled relation.

Figure 2 is a fragmentary plan view of the front end of the trailer with the auxiliary frame telescoped on the main frame in coupling relation, but with the tractor omitted.

Figure 3 is a vertical section through the front end of the trailer frame, taken at the line 3—3 on Figure 2.

Figure 4 is a view in side elevation of the trailer and rear end of the tractor, showing the trailer in temporary supported position, with the auxiliary frame extended upwardly and forward of the trailer main frame and the fifth wheel members connected together ready to complete the uncoupling or coupling operation.

Figure 5 is a transverse section through the auxiliary frame and trailer main frame taken at the line 5—5 on Figure 2.

Figure 6 is a vertical cross section through the front end of the trailer taken substantially as indicated at the line 6—6 on Figure 2, showing parts of the locking mechanism of the lower fifth wheel member on the tractor in locking engagement with the king pin.

Figure 7 is a front end view of the trailer main frame and auxiliary frame, as they would appear in coupling position of the trailer and tractor, the tractor being omitted.

Figure 8 is a fragmentary worms-eye view showing in perspective the brake locking and releasing mechanism.

Figures 9 and 10 are fragmentary views in plan and in side elevation respectively, showing the brake locking and releasing mechanism.

For clarity and for the purpose of illustrating the present invention, the semi-trailer is shown in the drawings with the body omitted and with the rear end of the tractor shown more-or-less diagrammatically. The trailer as shown comprises a main frame, 10, the rear end thereof being supported by a pair of wheels, 11, the forward end being either swivelly supported on the rear of the tractor, 12, or temporarily supported by means hereinafter described. This swivel connection consists of a fifth wheel having an upper member, 13, mounted on the underside of an auxiliary frame, 14, which is slidably supported in the main frame, 10, and a lower member, 15, pivotally supported on a transverse, horizontal axis on the rear end of the tractor to permit said lower member to be rocked fore-and-aft about its support. To make the present invention more clearly understood, it may be assumed that the construction of the fifth wheel is similar to that shown in Patent No. 1,412,025, issued to Martin et al, April 4, 1922. The lower fifth wheel member is formed with the usual V-shape slot (not shown) which guides the king pin, 17, secured to and depending from the underside of the upper fifth wheel member, 13, into the terminal of the slot where its head, 17ª, is automatically engaged by a pair of latch fingers, 16, locking the fifth wheel members together in operative relation. As shown in Figure 6 and Figure 4, these fingers are connected to links, 16ª, which in turn are connected to an operating bar, 16ᵇ, extending forwardly of the fifth wheel members and connected to a cable, 16ᶜ, which leads to a convenient place of manipulation in the driver's cab of the tractor (not shown). It is to be understood that the fingers, 16, are designed to yield in the direction to admit the pin, and lock it in the terminal portion of the V-slot, and the pin may only be released by moving the fingers clear of it by pulling the cable, 16ᶜ. The surrounding portion of the terminal of said V-slot is of a thickness to engage the shank, 17ᵇ, of said king pin between the upper fifth wheel member and the head, 17ª, and thereby prevent vertical separation of said fifth wheel members when they are locked in coupling relation. The king pin is secured to the upper fifth wheel member by a nut, 18, and the portion of said pin extending through said upper member, 13, is reduced at 17ᶜ, so that the shank, 17ᵇ, shoulders against the underside of said member, 13.

In tractor-trailer coupled position, the auxiliary frame, 14, is telescoped in the main-frame, 10, with the temporary supporting members in raised position as shown in Figure 1; and herein shown these members consist of wheels, 19, journaled at the lower ends of leg members, 20, which are rigidly secured to the end of the auxiliary frame. To uncouple the tractor and trailer, brakes are set on the trailer; the tractor then travels forwardly for a short distance, drawing the auxiliary frame out of the main frame, and by reason of the construction hereinafter described, the auxiliary frame tilts into inclined position, as shown in Figure 4, and remains inclined while the uncoupling operation is completed. By the time the auxiliary frame reaches its extended position, the supporting wheels, 19, are carried downwardly into ground-engaging position to assume the load of the trailer. In this extended position of the auxiliary frame, the fifth wheel members are relieved of load, and may be quickly and easily disengaged from each other by releasing the locking mechanism from the king pin, 17.

To couple the tractor and trailer, the operations are reversed, that is, the fifth wheel members engage each other by backing the tractor toward the trailer, with the king pin guided in the V-groove (not shown) in the lower member, until it is automatically locked thereto for securing said fifth wheel members together. The tractor is then backed further, carrying the auxiliary frame rearwardly into the main frame and simultaneously elevating the supporting wheels, 19; the portion of the load of the trailer assumed by the tractor increasing as it moves rearward in the final portion of the coupling operation. It will now be clear that the actual connection and disconnection of the fifth wheel members is performed during the initial and final portions respectively, of the coupling and uncoupling operations, when the load is supported entirely by the auxiliary wheels, 19.

The lower fifth wheel member, 15, is overbalanced rearwardly so that it assumes a definite rearwardly tilted position when uncoupled; the angle at which it is tilted being substantially the same as the inclination of the extended upper member to insure engagement of the king pin with the lower member in coupling relation.

The auxiliary frame, 14, may be composed of structural channel members, 25, secured together to form a rectangular frame, positioned centrally of and at the forward end of the main frame, 10. The main frame is also built of structural channels; the front end of said main frame includes short channel members, 26, at opposite sides of said auxiliary frame, and the channel members, 25, of the auxiliary frame are of slightly less height than the front members, 26, or side members, 27, of the main frame. The lower edges of both frames are substantially flush when the auxiliary frame is telescoped in the main frame, i. e. in coupled position, and the difference in height of said frames affords proper clearance, especially in tilting of the auxiliary frame to the position shown in Figure 4. The upper fifth wheel member is secured to the lower flanges of the channels, 25, and projects below said frames, as seen in the drawings, thus providing a large bearing surface for the fifth wheel.

The auxiliary frame extends slightly beyond the main frame when telescoped therein. The main frame includes a pair of intermediate channel members, 28, extending longitudinally of the trailer on opposite sides of the auxiliary frame, and also projecting beyond the front frame members, 26. A transversely extending pivot shaft, 29, is journaled in bearings, 30, secured to the projecting ends of the members, 28. Said shaft is retained in place by nuts, 31, on its outer ends, abutting said bearings. A pair of supporting rollers, 32, are mounted on said shaft, 29, positioned for engagement with guide tracks, 33, secured to the backs of the longitudinal auxiliary frame members, 25. The tracks and members, 25, are provided with coextensive, closed slots, 34, through which said pivot shaft extends without interfering with longitudinal movement of the auxiliary frame. These guide tracks are preferably cast members, being formed with closed ends conforming to the contour of the rollers, 32, so as to serve as abutments engaging the rollers for limiting the movement of the auxiliary frame.

The rear end of the auxiliary frame carries a transverse shaft, 40, the ends of which extend through the side members, 25, and bearings, 41, secured to the inner sides of said members. The outer ends of said shaft are fitted with rollers, 42, positioned for rolling engagement with downwardly curved guide tracks, 43, which depend rigidly from the intermediate channel members, 28, of the main frame, and cause the tilting of the auxiliary frame as it is extended forwardly. These guide tracks, 43, are cast members, each having its lower end formed with an offset pocket, 44, into which the rollers, 42, enter and seat for retaining the auxiliary frame in the inclined position, when the same is extended as shown in Figure 4. It is evident that the retention of the auxiliary frame in such inclined position is due mainly to the load of the forward end of the trailer assumed by the supporting legs, 20, and wheels, 19, which are rigid with said auxiliary frame.

When the auxiliary frame is telescoped into the main frame in coupled relation as shown in Figure 1, it is necessary to lock it in such position, and for this purpose I provide a locking mechanism which comprises a transversely extending rock shaft, 46, journaled adjacent its ends in bearings, 47, which are integral with cast lock supporting guides, 48, secured to the front side of an angle iron, 49, extending across the main frame and secured to the frame members, 27 and 28. As shown in Figure 3, the lock supporting guides, 48, are chambered for vertically movable locking dogs, 50, each of which is provided with an actuating pin, 51, extending laterally of said dog through a vertical slot, 52. Coil springs, 53, are disposed in the chambered portions of the members, 48, and adapted to normally tend to force the dogs downward into operative engagement with stops, 54, which for convenience may be integrally formed on the upper surface of the guide tracks, 33, adjacent their forward ends. Lock actuating fingers, 55, are fixed on the rock shaft, 46, outside of cast members, 48, in position to engage the pins, 51, of the locking dogs, 50, and a lever, 56, is fixed to the outer end of said shaft for rocking the same. A crank arm, 57, is fixed to the shaft, 46, and connected to an operating rod, 58, for controlling the brakes of the trailer. As shown in Figure 3, the lever, 56, is in brake releasing position with the locking dogs, 50, operatively locking the auxiliary frame in the main frame. But it will be clear that by moving the lever, 56, to the position shown in Figure 4, rocking the shaft, 46, the fingers, 55, will operate on pins, 51, to raise the locking dogs, 50, against the reaction of the springs, 53, to release the auxiliary frame from the main frame. This same rocking movement of the shaft causes longitudinal movement of the rod, 58, by the crank arm, 57, thus applying the trailer brakes.

After the brakes have been applied by the lever, 56, they are held in such position by automatic detent mechanism which is released, however, when the auxiliary frame has been telescoped back into the main frame. The mechanism includes the brake rod, 58, which is connected at its rear end to a crank arm, 65, mounted on one end of the rock shaft, 66, which is supported in bearing brackets, 67, secured to the intermediate frame members, 28, rearwardly of the auxiliary frame. Mounted at about the middle of the shaft, 66, is a downwardly extending crank arm, 68, which is pivotally connected at its outer end to a trip lock member, 69, extending rearwardly and pivotally connected at its opposite end to an operating rod, 70. Said rod, 70, in turn is pivoted to a crank arm, 71, on a brake rock shaft, 72, which is supported in brackets, 73, on the main frame forwardly of the rear wheels, 11. On the opposite ends of said shaft, 72, are crank arms, 74, which are pivoted to rods, 75, for actuating the brakes on the rear wheels.

A structural tie brace member, 77, connects the frame members, 28, rearwardly of the auxiliary frame and secured to said brace is a depending bracket, 78, reinforced at its lower end by a rearwardly extending brace member, 79. Said bracket is provided with a laterally extending catch lug, 80, normally in contact with the edge of the trip lock member, 69, as shown in Figure 9, and adapted to automatically engage in the lateral notch, 81, formed in the adjacent edge of the trip member, 69, when the linkage is moved forward for setting the brakes,—thus holding said linkage in brake applying position. One of the brackets, 67, is formed with a laterally extending arm, 82, on which is pivotally mounted a bell crank, 83, having an upwardly bent arm, 84, the end of which is provided with a bolt, 85, adapted to encounter the rear end of the auxiliary frame when telescoped in the main frame; said bolt being adjustable to vary the extent of protrusion of the end contacting said auxiliary frame to limit the extent of movement of the bell crank and its connecting linkage. The upper end of said arm, adjacent the bolt is formed with an upwardly extending lug, 86, adapted to cooperate with a down turned lug, 87, adjustably secured to the tie member, 77, for limiting the extent of forward swing of the arm about the pivot of the bell crank. The bell crank is provided with a short arm, 88, extending substantially horizontally and has rockably and pivotally connected at its outer end, a trip lock catch, 89, which is free to move about said pivot against the reaction of a spring, 90, connected at one end to said catch adjacent the pivot and connected at the other end to the bracket, 78. The trip lock catch, 89, extends above and beyond the trip lock member, 69, as shown in Figure 9.

It will be understood that the brake linkage including cranks, 68 and 71, and link members, 69 and 70, has sufficient looseness in its connections to permit positioning them out of a straight line, but that when the pull is exerted on the linkage in applying the brakes, these members tend to assume a straight line position, so that the trip member, 69, is urged laterally toward the catch lug, 80, insuring engagement thereof by the notch, 81. When the brakes are released and the auxiliary frame is locked into the main frame in coupled position the rear end of said auxiliary frame is in contact with the adjustable bolt of the upright arm, 84, of the bell crank at which position the arm, 84, is held, against the reaction of spring, 90, on the other arm, 88, of the bell crank. When the brakes are applied by actuation of rod, 58, in setting the lever, 56, the linkage including the trip member, 69, is moved longitudinally permitting its notch, 81, to be engaged by the catch lug, 80, thus holding the brakes applied and simultaneously with such movement the upright lug, 91, on the lock member, 69, engages a depending lug, 92, on the underside of catch member, 89, moving it rearwardly about its pivot. Then when the auxiliary frame is telescoped out of the main frame, spring, 90, acting on the bell crank, swings arm 84, forwardly which movement is limited by the stop lugs, 86 and 87. The lug, 92, on the under side of said catch, 89, is formed with two leg portions at substantially right angles of each other as indicated in dotted lines in Fig. 9; the edge of one leg portion being flush with the face of the hook portion, 95, of said catch member.

This forward movement of the bell crank arm 84, permits the short arm, 88, to move toward the center of the vehicle, carrying the catch member, 89, inwardly, freeing its lug, 92 from lug, 91 of strip member, 69; and due to the spring, 90, the free end of the catch member, 89, is caused to abut against the rear side of catch lug, 80. When in brake applying position, the lug, 94, on the lock member, 69, adjacent notch, 81, is moved just rearwardly of catch lug, 80. The face of this lug is inclined for engagement by the co-operating hook portion, 95, of catch member, 89. Thus when the auxiliary frame telescopes into the main frame, it moves arm, 84, rearwardly, causing the short arm, 88, to pull the catch member, 89, outwardly, the inclined face of the hook portion, 95, of catch member, 89, engaging the inclined face of lug, 94, on the trip lock member, 69, and moving said member, 69, laterally to free the notch, 81, from catch lug, 80. In this position a leg of lug, 92, of catch member, 89, is positioned between lugs, 91 and 94, of said lock member, 69, and in order to permit the lug, 94, to slide off the face of the hook portion, 95, said lug, 91, is formed with a rearwardly facing incline or cam surface, 91ª, which is adapted to be engaged by said leg of lug, 92, causing said catch, 89, to ride up over said lug, 91, by rocking about its pivot connection to the arm, 88, of the bell crank, 84. Said linkage then being permitted to move to brake releasing position. It will be understood that this releasing operation is entirely automatic and is carried into effect almost instantaneously as the auxiliary frame permits the springs acting to move the brake linkage to release position, to impart movement through the detent linkage for causing rocking of shaft, 66, which shifts rod, 58, rearwardly, and moves lever, 56, forwardly, thus permitting the dogs, 50, to be released for positively locking the auxiliary frame in the main frame completes its telescopic movement into the main frame.

For various reasons it may be desired to move the trailer about when uncoupled from its tractor, in which condition the trailer normally has its brakes set and it is therefore desirable to provide an independent release for the brakes. This includes an operating lever, 97, pivoted to the bracket member, 78, and having a downwardly extending arm or lug, 98, positioned to engage lug, 99, on the trip lock member, 69, when the same is in brake applying position.

Thus by swinging the lever, the lug, 98, shifts the member, 69, laterally, freeing the notch, 81, from catch lug, 80, and thus releasing the brakes; the brakes of course may be reset by lever, 56, at any time. A spring, 100, is connected to the main frame and to the lever, 97, for holding the lug, 98, out of contact with the trip lock member, 69.

Briefly the coupling operation of the tractor and trailer consists of the following movements:—first, backing the tractor toward the trailer so that the fifth wheel members engage and become automatically locked together while the auxiliary frame is still in extended position; then continuing the rearward movement of the tractor, telescoping the auxiliary frame into the main frame, thus tilting the fifth wheel members into horizontal position; simultaneously with this rearward movement, the temporary supporting members are automatically raised off the ground,—the brakes being automatically released in the manner already described. Substantially simultaneously with these automatic operations, the auxiliary frame becomes automatically locked in the main frame by the latch bolts, 50. To uncouple the vehicles the lever, 56, is first operated to set the brakes and lift the bolts, 50, then the tractor is moved forwardly, drawing the auxiliary frame out of the trailer (which is held against movement by its brakes); automatically lowering the temporary supports into operative position, the fifth wheel members then being released from the driver's cab to permit the vehicles to separate.

If desired, the setting of the brakes and releasing of the auxiliary frame locking mechanism may also be controlled from the driver's cab, but to insure safety, it is preferable to control this operation in the manner shown and described.

I claim:—

1. In combination with a tractor and a semi-trailer having a main frame, a fifth wheel, providing a turntable connection between said tractor and trailer, said fifth wheel including a lower member carried on the tractor and an upper member slidably mounted on the trailer main frame and forwardly extensible relative to said frame during uncoupling of the tractor from the trailer, means causing tilting of said upper member as it is forwardly extended, and supporting means rigidly connected to said upper member and movable therewith into trailer-supporting position when said upper member is moved to its extended and tilted position, said upper member when in such extended position being adapted for rearward movement relative to the main frame, upon coupling of the tractor and trailer, said combined tilting and rearward movement of the upper member simultaneously rendering said supporting means inoperative.

2. In combination, a tractor, a semi-trailer having a main frame, an auxiliary frame slidably carried by said main frame, a fifth wheel for swively supporting one end of said trailer on the tractor, including a lower member mounted on the tractor and an upper member carried by the auxiliary frame, said auxiliary frame being telescopically extensible forwardly of the main frame during the uncoupling of the tractor and trailer, and adapted to be telescoped into said main frame by the coupling of the tractor and trailer, and supporting means associated with said auxiliary frame and actuated thereby into and out of trailer-supporting position by the relative movement of the auxiliary frame during the uncoupling and coupling respectively to the tractor and trailer.

3. In the combination defined in claim 2, guiding means including rollers journaled to the main frame adjacent the forward end thereof in supporting engagement with the auxiliary frame providing a pivot axis about which said auxiliary frame and upper fifth wheel member tilt upwardly when extended during the uncoupling of the trailer and tractor.

4. In combination, a tractor, a semi-trailer having a main frame, and an auxiliary frame slidably carried thereby, a fifth wheel for swively supporting the trailer on the tractor, comprising a lower member mounted on the tractor and an upper member carried by the auxiliary frame, rollers journaled at the forward end of the main frame, tracks on said auxiliary frame engageable with the rollers for supporting the forward end of the auxiliary frame, said auxiliary frame and upper fifth wheel member being adapted for extension forwardly and upwardly over said rollers as a pivot during the uncoupling of the tractor from the trailer, said auxiliary frame and fifth wheel member being adapted for return movement when the tractor is backed toward the trailer, means for limiting the movement of the auxiliary frame relative to the main frame, and supporting members connected to the auxiliary frame and movable therewith into and out of trailer-supporting position.

5. In combination, a tractor, a semi-trailer having a main frame, an auxiliary frame slidably supported thereby, a fifth wheel comprising a two-part swivel, one part attached to the tractor and the other part carried by the auxiliary frame, said auxiliary frame and swivel part being forwardly extensible into an upwardly inclined position during the separation of the tractor from the trailer, and being adapted for return movement when the tractor is backed toward the trailer; supporting means connected to the auxiliary frame movable into and out of trailer supporting position by the relative tilting movement of said auxiliary frame, and means guiding the upward movement of said auxiliary frame and upper swivel part.

6. In the combination defined in claim 5, said guiding means including a roller for the forward end, and a downwardly inclined track for the rear end of said auxiliary frame.

7. In the combination defined in claim 5, means for holding said auxiliary frame and upper swivel part in upwardly inclined position when the trailer is uncoupled from the tractor for maintaining the trailer supporting means in operative position.

8. In the combination defined in claim 5, rollers on the auxiliary frame co-operating with inclined tracks on the main frame whereby the rear end of the auxiliary frame is caused to move downwardly in a predetermined path, carrying said supporting means into ground engaging position for supporting the trailer when it is uncoupled from the tractor.

9. In the combination defined in claim 5, rollers on the auxiliary frame co-operating with inclined tracks on the main frame whereby the rear end of the auxiliary frame is caused to move downwardly in a predetermined path, carrying said supporting means into ground engaging position for supporting the trailer, said tracks being formed with pockets in which said rollers are seated by the weight of the trailer on the supporting means.

10. In combination, a tractor, a semitrailer having a main frame, an auxiliary frame slidably associated therewith, a fifth wheel for swivelly supporting the trailer on the tractor when connected thereto, and including a lower member rockably mounted on the tractor, and an upper member carried by the auxiliary frame, a king pin on the upper member, engageable by locking means associated with the lower member, said auxiliary frame and upper fifth wheel member being adapted for forward extension relative to the trailer by virtue of this connection to the lower member on the tractor during the initial part of the uncoupling operation, means causing upward tilting of said extended of the auxiliary frame and both fifth wheel members as said frame is carried forwardly during said initial part of the uncoupling operation said auxiliary frame and upper member being designed to remain in such extended position while uncoupled; the king pin being positioned for engagement by the lower member for moving said auxiliary frame and upper member to return position during the final part of the coupling operation of the tractor and trailer, and supporting means rigidly connected to the auxiliary frame, and responsive to the relative movement of the same for being shifted into and out of trailer supporting position.

11. In the combination defined in claim 10, means for retaining said auxiliary frame and upper member upwardly tilted while uncoupled, whereby to facilitate the engagement of the fifth wheel members in coupling the tractor and trailer.

12. The method of coupling a tractor and semi-trailer which consists in supporting a trailer temporarily with the forward end of its upper fifth wheel member tilted upwardly, then moving the tractor frame thereunder with its lower fifth wheel member tilted in co-operating relation for engaging the upper fifth wheel member, then causing both of said fifth wheel members to be shifted as a unit to a horizontal position such shifting of the fifth wheel members simultaneously rendering the temporary support inoperative.

13. The method of coupling a tractor and semi-trailer which consists in supporting a trailer temporarily with the forward end of its upper fifth wheel member tilted upwardly, then moving the tractor frame thereunder with its lower fifth wheel member inclined in co-operating relation, then engaging and locking the fifth wheel members together; a further portion of the coupling movement causing said fifth wheel members to assume a substantially horizontal position and simultaneously carry the temporary support out of operative position.

14. The method of coupling and uncoupling a tractor and semi-trailer, consisting in supporting the trailer temporarily with the upper fifth wheel member tilted forward and upward, then moving the tractor frame thereunder with its lower fifth wheel member tilted in co-operating relation for engaging the upper fifth wheel member, then causing said fifth wheel members to assume a substantially horizontal position and carrying the supporting means out of ground-engaging position; the initial portion of the uncoupling movement consisting in tilting both of the fifth wheel members forwardly and upwardly, and simultaneously moving the supporting means into ground-engaging position, then unlocking said fifth wheel members and separating them for completing the uncoupling operation.

15. The method of coupling a tractor and semi-trailer which consists in temporarily supporting the forward end of the trailer with the upper fifth wheel member inclined forwardly and upwardly, then moving the tractor toward the trailer with the lower fifth wheel member thereon tilted rearwardly in co-operating relation for engaging the upper fifth wheel member, locking the fifth wheel members together in such inclined position; then swinging said fifth wheel members together to a horizontal position.

16. The method of coupling and uncoupling a tractor and semi-trailer which consists in temporarily supporting the forward end of the trailer with its upper fifth wheel member disposed in an upwardly and forwardly inclined position, then moving the tractor toward the trailer with the lower fifth wheel member thereon tilted in co-operating relation for engaging the upper fifth wheel member, locking the fifth wheel members together in such inclined position, and swinging them together to a horizontal position; the uncoupling operation consisting in swinging the fifth wheel members together to an inclined position, then unlocking said members to permit separation thereof in such inclined position.

17. The method of coupling a tractor and semi-trailer which consists in temporarily supporting the forward end of the trailer with the upper fifth wheel member tilted forwardly and upwardly; then moving the tractor frame thereunder with its lower fifth wheel member tilted at a corresponding angle for engaging the upper fifth wheel member and then moving both of said fifth wheel members to a substantially horizontal position.

18. The method of coupling a tractor and semi-trailer which consists in temporarily supporting the forward end of the trailer with the upper fifth wheel member tilted forwardly and upwardly; then moving the tractor frame thereunder with its lower fifth wheel member tilted in co-operating relation for engaging the upper fifth wheel member, moving both of said fifth wheel members to a substantially horizontal position, and utilizing such movement for rendering the temporary support inoperative.

19. In combination with a tractor and semi-trailer, a fifth wheel for swivelly supporting one end of the trailer on the tractor including an upper member movably mounted on the trailer, and a lower member movably mounted on the tractor, whereby the upper member is adapted to assume a forwardly and upwardly inclined position, and the lower member a rearwardly and downwardly inclined position at planes substantially parallel to each other when uncoupled, and said members are adapted to be swung together to a horizontal position when engaged.

20. In the combination set forth in claim 19, and means for locking the fifth wheel members together while said members are disposed in such inclined relation.

21. In combination with a tractor and a semi-trailer having a main frame, an auxiliary frame movably supported thereby, means for normally locking it to the main frame, a swivel connection between the tractor and trailer comprising an upper member carried by the auxiliary frame and a co-operating lower member mounted on the tractor, said locking means being adapted for releasing the auxiliary frame for movement in the uncoupling of the vehicles, said locking means having connections serving also for setting the brakes of the trailer, and means actuated by said auxiliary frame during the coupling operation for effecting the release of said trailer brakes.

22. In the combination defined in claim 21, said last mentioned connections also being arranged for simultaneously rendering the locking means operative for locking the auxiliary frame to the main frame.

23. In combination with a tractor and a semi-trailer having a main frame, an auxiliary frame movably supported thereby and normally locked thereto, a swivel connection between the tractor and trailer comprising an upper member carried by the auxiliary frame and a co-operating lower member mounted on the tractor, manually operable means adapted for releasing the auxiliary frame for movement during uncoupling of the vehicles and also serving for applying the trailer brakes, independently operable means for releasing said brakes at will, and means actuated by the return movement of the auxiliary frame for insuring release of the trailer brakes during the coupling operation.

24. In combination with a tractor and semi-trailer, a fifth wheel for swivelly supporting one end of the trailer on the tractor, including an upper member movably mounted on the trailer and a lower member pivotally carried on the tractor for adjustment about an axis below the plane of engagement of said upper and lower members, whereby the upper member is adapted to assume a forwardly and upwardly inclined position and the lower member a rearwardly and downwardly inclined position at planes substantially parallel to each other when uncoupled, and said members are adapted to be swung together to a horizontal position by the relative movement thereof about said axis when engaged.

25. In combination with a tractor and a semi-trailer, a fifth wheel for swivelly supporting one end of the trailer on the tractor when coupled thereto, said fifth wheel including an upper member movably mounted on the trailer and a lower member movably mounted on the tractor, said upper member being adapted to be tilted in a forwardly and upwardly inclined position and the lower member in a downwardly and rearwardly inclined position, during the separation of the tractor and trailer, said members being adapted when engaged during coupling operation to be swung together to a horizontal position, and supporting means adapted to be actuated by the tilting movement of said upper member for moving said means out of and into trailer supporting positions respectively.

26. In combination with a tractor and a semi-trailer, a fifth wheel swivelly supporting the trailer on the tractor when coupled thereto, said fifth wheel comprising a lower member on the tractor, mounted for rocking about a transverse horizontal axis, and an upper co-operating member movably mounted on the trailer, the forward end of said upper member being adapted for tilting upwardly during uncoupling of said trailer and tractor and to be tilted downwardly during the coupling action, and means connected to said upper member adjacent its rear end, adapted to be moved into and out of trailer supporting position by virtue of the tilting action of said upper member, said lower member rocking to accommodate itself to the tilting of the upper member.

27. In combination, a tractor, a semi-trailer having a main frame, an auxiliary frame slidably carried by the main frame, a fifth wheel for swivelly supporting the trailer on the tractor when connected thereto, the fifth wheel comprising a lower member mounted on the tractor and a co-operating upper member secured to the auxiliary frame, said upper member and auxiliary frame being forwardly extensible during the initial part of the uncoupling operation, and returnable to the original position by the final portion of the movement for coupling the tractor to the trailer, means movable into and out of trailer supporting position by the relative movement of the auxiliary frame, and means for locking the auxiliary frame to the main frame when the same is shifted into coupling position, an operating lever arranged for releasing said locking means, and connections from said lever adapted to simultaneously apply the brakes of the trailer when the auxiliary frame is unlocked from the main frame, together with detent means associated with the brake connections and releasable by the return of the auxiliary frame to locked position.

28. In combination with a tractor and semi-trailer, a fifth wheel for swivelly supporting the end of the trailer on the tractor, said fifth wheel including a lower member mounted on the tractor for tilting about a transverse horizontal axis and an upper co-operating member tiltably mounted on the trailer, said members being caused to assume co-operatively tilted positions when the tractor and trailer are uncoupled, and adapted when engaged during coupling of said vehicles, to be swung about the transverse axis of said lower fifth wheel member to a substantially horizontal position.

29. In combination with a tractor and semi-trailer, a fifth wheel for swivelly supporting the end of the trailer on the tractor, said fifth wheel including a lower member mounted on the tractor for tilting about a transverse horizontal axis and an upper co-operating member tiltably mounted on the trailer, supporting means connected to the upper member, arranged for temporarily supporting the trailer when the vehicles are uncoupled, said fifth wheel members being caused to assume co-operatively tilted positions when the tractor and trailer are uncoupled, and adapted when engaged during the coupling movements of said vehicles to be swung about the transverse axis of the lower fifth wheel member to a substantially horizontal position, such movement of the fifth wheel members rendering the temporary trailer supporting means inoperative.

30. In combination with a tractor and a semi-trailer, a fifth wheel providing a turntable connection between said tractor and trailer, said fifth wheel including a lower member mounted on the tractor for rocking about a transverse horizontal axis, and normally assuming a rearwardly tilted position when uncoupled, and an upper member slidably and rockably mounted on the trailer and adapted to assume an extended and upwardly tilted position when the tractor and trailer are uncoupled, temporary supporting means for the trailer, connected to the upper fifth wheel member, and movable in response to the extending movement of said upper member into operative position, said fifth wheel members being adapted when engaged during coupling of the vehicles to be rocked about the axis of the lower member as a unit to a substantially horizontal position, shifting the upper member rearwardly relative to the trailer and simultaneously rendering the trailer supporting means inoperative.

HARRY W. HELMS.